US011977784B2

(12) United States Patent
Ma et al.

(10) Patent No.: US 11,977,784 B2
(45) Date of Patent: May 7, 2024

(54) DYNAMIC RESOURCES ALLOCATION METHOD AND SYSTEM FOR GUARANTEEING TAIL LATENCY SLO OF LATENCY-SENSITIVE APPLICATION

(71) Applicant: Institute of Computing Technology, Chinese Academy of Sciences, Beijing (CN)

(72) Inventors: Liuying Ma, Beijing (CN); Zhenqing Liu, Beijing (CN); Jin Xiong, Beijing (CN); Dejun Jiang, Beijing (CN)

(73) Assignee: Institute of Computing Technology, Chinese Academy of Sciences, Beijing (CN)

( * ) Notice: Subject to any disclaimer, the term of this patent is extended or adjusted under 35 U.S.C. 154(b) by 31 days.

(21) Appl. No.: 17/908,495

(22) PCT Filed: Jul. 6, 2020

(86) PCT No.: PCT/CN2020/100359
§ 371 (c)(1),
(2) Date: Aug. 31, 2022

(87) PCT Pub. No.: WO2021/174735
PCT Pub. Date: Sep. 10, 2021

(65) Prior Publication Data
US 2023/0128059 A1 Apr. 27, 2023

(30) Foreign Application Priority Data
Mar. 3, 2020 (CN) .......................... 202010139287.1

(51) Int. Cl.
*G06F 3/06* (2006.01)

(52) U.S. Cl.
CPC .......... *G06F 3/0659* (2013.01); *G06F 3/0611* (2013.01); *G06F 3/0622* (2013.01); *G06F 3/067* (2013.01)

(58) Field of Classification Search
None
See application file for complete search history.

(56) References Cited

U.S. PATENT DOCUMENTS

2004/0194095 A1* 9/2004 Lumb ................... G06F 9/4887
718/100
2017/0317944 A1* 11/2017 John ................... H04L 43/0864
(Continued)

FOREIGN PATENT DOCUMENTS

CN 109766168 A 5/2019
CN 109766180 A 5/2019
(Continued)

OTHER PUBLICATIONS

International Search Report for International Application No. PCT/CN2020/100359 dated Nov. 27, 2020.

*Primary Examiner* — Prasith Thammavong
*Assistant Examiner* — Edmund H Kwong
(74) *Attorney, Agent, or Firm* — MASCHOFF BRENNAN (57) ABSTRACT

The present invention proposes a dynamic resources allocation method and system for guaranteeing tail latency SLO of latency-sensitive applications. A plurality of request queues is created in a storage server node of a distributed storage system with different types of requests located in different queues, and thread groups are allocated to the request queues according to logical thread resources of the service node and target tail latency requirements, and thread resources are dynamically allocated in real time, and the thread group of each request queue is bound to physical CPU resources of the storage server node. The client sends an (Continued)

application's requests to the storage server node; the storage server node stores the request in a request queue corresponding to its type, uses the thread group allocated for the current queue to process the application's requests, and sends responses to the client.

10 Claims, 3 Drawing Sheets

(56) References Cited

U.S. PATENT DOCUMENTS

2019/0190805 A1 6/2019 Hunt et al.
2020/0192725 A1* 6/2020 Feldkamp ............. G06F 9/5027

FOREIGN PATENT DOCUMENTS

CN 109783227 A 5/2019
CN 110830391 A 2/2020

* cited by examiner

DYNAMIC RESOURCES ALLOCATION METHOD AND SYSTEM FOR GUARANTEEING TAIL LATENCY SLO OF LATENCY-SENSITIVE APPLICATION

CROSS REFERENCE TO RELATED APPLICATIONS

This application is a national application of PCT/CN2020/100359, filed on Jul. 6, 2020. The contents of PCT/CN2020/100359 are all hereby incorporated by reference.

TECHNICAL FIELD

The present invention relates to the technical field of distributed storage system, in particular to the technical field of guaranteeing low tail latency requirements of latency-sensitive applications.

BACKGROUND

Figure 1:
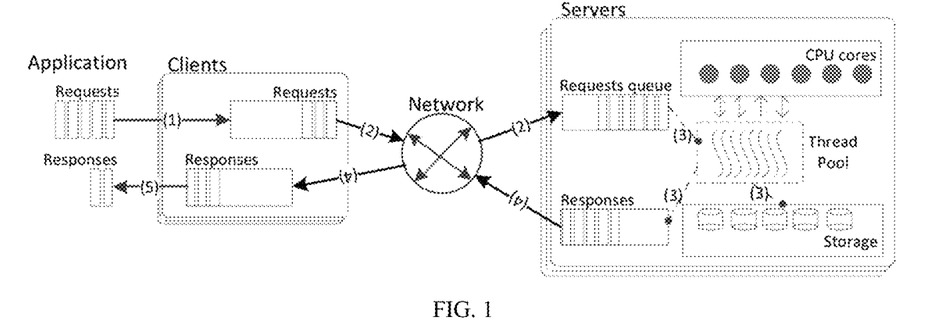
FIG. 1 is a request processing flow chart of a distributed storage system.

Distributed storage systems use typical client-server models. A request for accessing a distributed storage system is processed according to the following steps: (1) an application requests to access a client of the distributed storage system; (2) the client sends the request to a server via a network; (3) the server accepts the request from the network and starts processing, the request first en-queues to queue after arriving at the server, and the request is taken from the queue and then processed if there is an idle thread; (4) after the request is processed at the server side, a response thereof is sent to the client via the network; and (5) the client sends the received response to the request to the application. The request has been processed at this point, as shown in FIG. 1. In the above step (3), processing of the request on the server side is complicated, involving request queuing, thread processing, resource allocation and storage access. After receiving the request via the network, the server side places the request in a corresponding queue. Request queues on the server side can queue in a single-queue or multi-queue mode. Then, requests are handled by threads. Generally, the server side starts a thread pool composed of multiple threads when the system is initialized for subsequent processing of the request. The threads take the requests from the queue based on different de-queue strategies and process the requests. During the processing of the requests, the threads access a storage device, and finally send the responses to the clients via the network. A thread can only process one request at a time, and a next request can be processed only after a previous request has been processed. Threads are logical resources for processing requests. In a real process, the threads need to run on CPU cores to complete the processing of the requests.

The applications deployed on a distributed storage system are typically classified into two classes, namely latency-sensitive (LS) applications and batch-job applications. Generally, the latency-sensitive applications are characterized by small request granularity, high priority and need of guaranteeing high percentile tail latency (e.g., 99th/99.9th), whereas the batch-job applications are featured with large request granularity, low priority and absence of strict bandwidth requirement. To prevent other types of applications from interfering with the latency-sensitive applications due to resource competition and affecting the tail latency, a simplest way is to deploy this type of applications separately on a storage system to monopolize system resources or to pre-allocate the system resources according to peak load thereof, so the tail latency requirements thereof can be met. Obviously, this leads to underutilization of the system resources and low utilization rate. According to relevant studies, resource utilization rate of the storage system in a data center is between 10% and 45%. The storage system is usually deployed on a large scale, involving up to thousands of service nodes, and such low resource utilization rate will consume huge capital and operation costs. To improve the resource utilization rate of the storage system, the latency-sensitive applications are collocated with the batch-job applications, but the batch-job applications will inevitably compete with the latency-sensitive applications for resources (e.g., CPU, network and storage), consequently affecting the tail latency of the latency-sensitive applications.

For this reason, a lot of efforts have been made on "how to efficiently manage resources of the storage system and use suitable thread models to process as many batch-job application requests as possible for the hybrid deployment of the latency-sensitive applications and the batch-job applications in a distributed storage system on the premise of meeting the high percentile tail latency SLO requirements of the latency-sensitive applications, so as to improve the system resource utilization rate.

Figure 2:
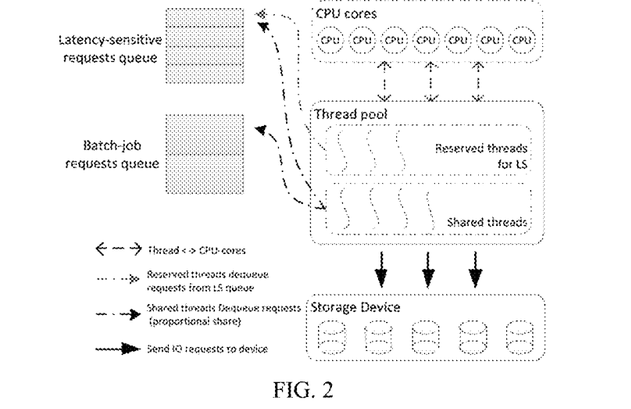
FIG. 2 is a Cake thread model diagram.

(1) Cake manages and allocates logical thread resources, and dynamically adjusts the thread resources based on proportional share and reservation strategies between the latency-sensitive applications and the batch-job applications. Cake adjusts the thread resources at fixed intervals. According to a ratio of the tail latency SLO to a target SLO of the latency-sensitive application in a previous interval (10 s), the threads serve the requests of the two types of applications by prioritizing the proportional share strategy according to different proportions. After adjustment, if the target SLO requirements cannot be met through the proportional share strategy alone, the reservation strategy is used, that is, separate threads are reserved for the latency-sensitive applications to exclusively serve latency-sensitive application requests, and the remaining threads are still shared threads and serve the two types of applications according to the proportional share strategy. Cake thread model and scheduling principle are as shown in FIG. 2.

Figure 3:
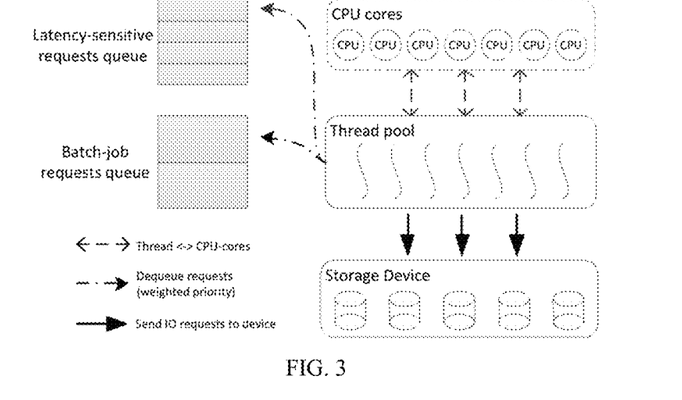
FIG. 3 is a Ceph server thread model diagram.

(2) Ceph, a highly reliable and scalable open source distributed storage system capable of providing unified storage (object, block and file), is widely applied in cloud scenarios, analysis of thread model in Ceph storage server have been carried out. According to findings, in the scenarios with the hybrid deployment of the latency-sensitive applications and the batch-job applications, the two types of applications share the thread resources in a thread pool. Although a weight-based priority strategy is provided when requesting scheduling, shortcomings still exist: tail latency SLO of the latency-sensitive applications is still not guaranteed; there is disordered competition among resources (e.g., CPU/network/storage) within storage nodes, and the thread models cannot be dynamically and adaptively adjusted according to application performance requirements. The Ceph thread model and request scheduling principle are as shown in FIG. 3.

(3) Arachne, a user mode thread management model, allocates physical CPU core resources according to the requirements of the latency-sensitive applications, processes batch-job requests with the remaining CPU core resources, and manages placement of the logical thread resources on allocated physical CPU cores (load balancing on each CPU core is taken into consideration during creation of the threads). When Arachne adjusts the physical CPU resources, if time spent on executing user threads on the allocated CPU cores is lower than a threshold, the CPU core resources will be reduced; and if the number of the user threads on the allocated CPU cores exceeds the set threshold, the CPU core resources will be increased. When serving the requests, a thread is created on the allocated physical CPU core for each request, and a request processing process thereof does not involve underlying IO operations. Lifecycle of the thread is at microsecond-level, that is, all the threads are short-lived threads (thread-per-request). Arachne allows 56 short-lived threads to run on the same physical CPU core.

(4) Shenango also proposed a method for allocating physical CPU core resources between latency-sensitive applications and batch-job applications. In the method, an efficient congestion detection algorithm is used to dynamically adjust allocation of the physical CPU cores for the latency-sensitive applications. The algorithm monitors threads and requests queuing on the allocated cores at a fixed interval of 5 us. If any thread or request is found to queue on the CPU core for more than two intervals, a CPU core will be added to the applications. If an allocated CPU core is found idle, the idle CPU core will serve the requests of the batch-job applications. Shenango only allocates the physical CPU core resources, and does not propose a strategy for placing the threads on the CPU cores. Similar to Arachne, the threads involved in Shenango are also short-lived threads, and the underlying IO operations are not involved in request processing by the threads.

(5) For the scenarios with the hybrid deployment of the latency-sensitive applications and the batch-job applications, PerfIso adjusts the physical CPU core resources dynamically, always reserves a fixed number of idle CPU cores for the latency-sensitive applications to guarantee that the requests thereof can be served immediately, and the remaining CPU core resources are used to serve the batch-job applications. PerfIso does not manage the logical thread resources and is only responsible for the allocation of the CPU core resources. The method that PerfIso aims at a fixed scenario (Microsoft Bing), and has poor universality. At the same time, a key idea thereof makes a fixed number of CPU cores in the system always idle, obviously resulting in low system resource utilization rate.

(6) Heracles allocates the physical CPU core resources to the latency-sensitive applications and the batch-job applications based on a feedback-based control method, and the method comprises the following steps: obtaining tail latency of latency-sensitive applications at a fixed interval (15 s) and comparing the tail latency with a target tail latency thereof, determining whether to allow batch-job applications to run according to a load pressure of the latency-sensitive applications; if the batch-job applications are allowed to run, monitoring bandwidth of the batch-job applications and a difference between measured tail latency of the latency-sensitive applications and the target tail latency thereof, and allocating physical CPU core resources between the two types of applications. However, the method does not involve the management of the thread resources.

Cake only allocates the logical thread resources of the system, and does not involve the physical CPU resources. The latency of the latency-sensitive applications will be affected when the latency-sensitive applications and the batch-job applications share the same thread resources. The shared threads process the two types of application requests based on the proportional share policy, which may result in untimely processing of the requests of the latency-sensitive applications, thus affecting the tail latency of the requests. Even if threads are reserved for the latency-sensitive applications, the reserved threads and the shared threads may still locate on the same core, competing for the CPU resources. This also causes mutual interference, resulting in that the target SLO of the latency-sensitive applications cannot be met. In Ceph, an open source distributed storage system, when logical threads process requests of the latency-sensitive applications and the batch-job applications, although the request of the latency-sensitive application can be prioritized according to a certain weight, thread resources are still shared in nature, and physical resources used are also completely share. This also causes interference, resulting in failure to meet the target SLO of the latency-sensitive applications. Neither Cake nor Ceph clearly defines a relationship between the logical thread resources and the physical CPU resources, resulting in disordered competition for the physical resources among the logical resources. There will be competition when the logical threads processing different types of requests share the physical resources, inevitably seriously affecting the tail latency of the latency-sensitive applications.

Although Arachne manages the thread resources on the allocated physical CPU cores, all the threads involved are short-lived threads, with the lifecycle at microsecond level, and the threads do not involve the underlying IO operations when processing IO requests. By contrast, in the dynamic thread allocation method of the present invention, threads are long-lived threads, and created when the system is initialized. The threads keep running all the time during subsequent request processing, and the request processing by the threads involves underlying IO processing. Shenango only allocates the physical CPU core resources among different types of applications, without involving in thread management, such as how the threads are deployed on the physical CPU resources. In addition, the threads in shenango are also short-lived threads, and no underlying IO operations are involved during the request processing. PerfIso guarantees the target tail latency requirement of the latency-sensitive applications by always reserving a fixed number of idle physical CPU cores, resulting in low system resource utilization rate. PerfIso does not control threads, and optimization methods thereof are only suitable for special scenarios, resulting in poor universality. Heracles uses a feedback-based approach to allocate the system resources between the latency-sensitive applications and the batch-job applications. Such allocation is coarse-grained, and the threads are not managed.

Current researches optimize and solve the above problems from different perspectives, such as allocating the physical CPU resources (e.g., Shenango/Heracles), allocating the logical thread resources (e.g., Cake/Ceph), or meeting target requirements of the latency-sensitive applications by always reserving a fixed number of the physical CPU resources (e.g., PerfIso). Some researches aim to combine the physical resources and the logical resources (e.g., Arachne), but only target at threads with extremely short lifecycle (microsecond-level), and do not involve the underlying IO processing. If only the physical CPU resources are considered to be divided among different types of applications, there is also a competition between logical thread resources and physical CPU resources. If only the logical resources are considered to be allocated among different applications, there is also a competition for the physical CPU resources among the logical thread resources of different applications. If a fixed number of idle physical CPU resources are always reserved for the latency-sensitive applications, this will obviously lead to low system resource utilization rate. Taking the allocation of both the logical resources and the physical resources into consideration can avoid resource competition to a certain extent. However, in an actual distributed storage system, read and write requests will inevitably access an underlying storage device (namely, executing I/O operations), which makes the lifecycle of the threads far beyond the microsecond level. In this case, running many short-lived threads on the same physical CPU is no longer practical as the lifecycle of the threads will be prolonged when underlying I/O operations are involved.

INVENTION DISCLOSURE

The present invention aims to solve the problem that tail latency SLO of latency-sensitive applications cannot be met and low resource utilization due to resource competition and inflexibility of thread models in existing approaches, and proposes a window-based dynamic thread resources allocation method.

For the limitations of existing approaches, the present invention proposes a dynamic resources allocation method for guaranteeing tail latency SLO of latency-sensitive applications, comprising the following steps:

step 1: creating a plurality of request queues in a storage server node of a distributed storage system with different types of requests located in different queues, and allocating threads to the request queues according to logical thread resources of the service node and target tail latency requirements of the latency-sensitive applications with the thread group of each request queue bound with physical CPU cores of the service node;

step 2: dividing queue requests of the latency-sensitive applications within the storage server node into request-based windows, allocating the threads by combining window information with the target tail latency requirements of latency-sensitive applications, monitoring request processing rate in the window and arrival rate of subsequent requests in real time, and dynamically adjusting the threads of the latency-sensitive queues in real time to guarantee the target tail latency requirements, with remaining thread resources serving other applications;

step 3: sending application's requests to the storage server node by a client; storing the application's requests in a request queue corresponding to its type, processing the application's requests using a thread group allocated for the current queue, and sending responses to the client.

In the dynamic resources allocation method for guaranteeing tail latency SLO of latency-sensitive applications, the access type comprises an access latency-sensitive type, and the step 3 comprises the following steps:

step 31: setting the request queue of the access latency-sensitive type as a latency-sensitive queue, dividing the application access requests in the latency-sensitive queue into windows, treating all requests in the current latency-sensitive queue as a window $W_i$, and subsequent incoming requests that enter into queue belong to the next window $W_{i+1}$;

step 32: maintaining the following information throughout lifecycle of the window $W_i$: {$ER_i$, $QL_i$, $TW_i$, $DR_i$}, where $ER_i$ is a request en-queue rate of the window $W_i$, $QL_i$ is size of the window $W_i$, $TW_j$ is wait time, and $DR_i$ is a request de-queue rate of the window $W_i$; when size of the window $W_i$ is not determined, and $DR_i \equiv 0$ and $ER_i > 0$, requests en-queue at this time; once the size of the window $W_i$ is determined, and $ER_i \equiv 0$ and $DR_i > 0$, at this time, the requests in the window $W_i$ de-queue and are processed by the allocated thread group.

In the dynamic resources allocation method for guaranteeing tail latency SLO of latency-sensitive applications, the step 3 comprises the following steps:

step 33: according to the target tail latency $T_{slo}$ nof the latency-sensitive applications and I/O time $T_{io}$ of the request, and in combination with state information maintained for the window $W_i$, when the window $W_i$ is created, allocating $N_i$ threads to the window, and estimating $N_i$ according to the following equation:

$$N_i = \frac{QL_i}{T_{slo} - T_{io} - TW_i} \times T_{io}.$$

In the dynamic resources allocation method for guaranteeing tail latency SLO of latency-sensitive applications, the step 3 comprises the following steps:

step 34: as for the window $W_i$, assuming that a i-$^{th}$ request de-queues at time $T_i$, a j-$^{th}$ request de-queues at time $T_j$, and the number of de-queuing requests within time $T_j - T_i$ is $DQ_i$, calculating a de-queue rate $DR_j$ of the requests as $DQ_i/(T_j - T_i)$, and an ideal de-queue rate $DR_i^{ideal}$ of the window $W_i$ as $QL_i/(T_{slo} - T_{io} - TW_i)$; and step 35: monitoring a difference between the request de-queue rate $DR_i$ and the ideal de-queue rate $DR_i^{ideal}$ of the window $W_i$ in real time, if $DR_i < DR_i^{ideal}$, setting the number of threads $N_i$ required by the window $W_i$ as a total number of threads in the system N; and if $DR_i \geq DR_i^{ideal}$, calculating the number of threads required by the window $W_i$ according to $$N_i = \frac{QL_i}{T_{slo} - T_{io} - TW_i} \times T_{io}.$$

In the dynamic resources allocation method for guaranteeing tail latency SLO of latency-sensitive applications, the step 3 comprises the following steps:

step 36: as for the window $W_i$, assuming that the i-$^{th}$ request en-queues at time $T_i$, the j-$^{th}$ request en-queues at time $T_j$, and the number of en-queuing requests within the time $T_j - T_i$ is $EQ_i$, calculating the request de-queue rate $ER_i$ as $EQ_i/(T_j - T_i)$; and step 37: monitoring the request de-queue rate $DR_i$ of the window $W_i$ and the request en-queue rate $ER_{i+1}$ of the window $W_{i+1}$ in real time, as for the window $W_i$, if $DR_i < ER_{i+1}$, setting the number of threads in the window $W_i$ as the total system thread N; and if $DR_i \geq ER_{i+1}$, calculating the number of threads required by the window $W_i$ again according to $$N_i = \frac{QL_i}{T_{slo} - T_{io} - TW_i} \times T_{io}.$$

In the window-based dynamic thread resources allocation method for guaranteeing tail latency SLO of the latency-sensitive applications in a distributed storage system, the thread group comprises a backup thread and a main thread, and when the main thread is blocked by underlying I/O operations, the backup thread is awakened to process the requests on the queue.

The present invention also provides a dynamic resources allocation system for guaranteeing tail latency SLO of latency-sensitive applications, comprising:

a module 1, wherein a plurality of request queues is created in a storage server node of a distributed storage system with different types of requests located in different queues, and thread groups are allocated to the request queues according to logical thread resources of the service node and target tail latency requirements of the latency-sensitive applications with the thread group of each request queue bound with physical CPU cores of the storage server node;

a module 2, wherein queue requests of the latency-sensitive applications within the storage server node are divided into windows, the thread resources (thread group) are allocated by combining window information with the target tail latency requirements of latency-sensitive queues, request processing rate in the window and arrival rate of subsequent requests are monitored in real time, and the thread resources of the latency-sensitive queues are dynamically adjusted in real time to guarantee the target tail latency requirements, with remaining thread resources serving other applications; and a module 3, wherein a client sends an application's requests to the storage server node; the storage server node stores the application's requests in a request queue corresponding to type thereof according to the type thereof as a current queue, a thread group allocated for the current queue processes the application's requests, and responses are sent to the client.

In the dynamic resources allocation system for guaranteeing tail latency SLO of latency-sensitive applications, wherein the access type comprises an access latency-sensitive type, and the module 3 comprises:

a module 31, wherein the request queue of the access latency-sensitive type is set as a latency-sensitive queue, the application's requests in the latency-sensitive queue are divided into windows, all requests in the current latency-sensitive queue are treated as a window $W_i$, and subsequent incoming requests that enter into queue belong to the next window $W_{i+1}$; and a module 32, wherein the following information is maintained throughout the lifecycle of the window $W_i$: {$ER_i$, $QL_i$, $TW_i$, $DR_i$}, where $ER_i$ is a request en-queue rate of the window $W_i$, $QL_i$ is size of the window $W_i$, $TW_i$ is wait time, and $DR_i$ is a request de-queue rate of the window $W_i$; when size of the window $W_i$ is not determined, and $DR_i \equiv 0$ and $ER_i > 0$, requests en-queue at this time; once the size of the window $W_i$ is determined, and $ER_i \equiv 0$ and $DR_i > 0$, at this time, the requests in the window $W_i$ de-queue and are processed by the allocated thread group.

In the dynamic resources allocation system for guaranteeing tail latency SLO of latency-sensitive applications, wherein the module 3 comprises:

a module 33, wherein according to the target tail latency $T_{slo}$ of the latency-sensitive applications and I/O time $T_{io}$ of the request, and in combination with the state information maintained for the window $W_i$, $N_i$ threads are allocated to the window $W_i$ when the window is created, and $N_i$ is estimated according to the following equation:

$$N_i = \frac{QL_i}{T_{slo} - T_{io} - TW_i} \times T_{io}.$$

In the dynamic resources allocation system for guaranteeing tail latency SLO of latency-sensitive applications, wherein the module 2 comprises:

a module 34, wherein as for the window $W_i$, assuming that a i-$^{th}$ request de-queues at time $T_i$, a j-$^{th}$ request de-queues at time $T_j$, and the number of de-queuing requests within time $T_j-T_i$ is $DQ_i$, a de-queue rate $DR_i$ of the requests is calculated as $DQ_i/(T_j-T_i)$, and an ideal de-queue rate $DR_i^{ideal}$ of the window $W_i$ is calculated as $QL_i/(T_{slo}-T_{io}-TW_i)$; and a module 35, wherein a difference between the request de-queue rate $DR_i$ and the ideal de-queue rate $DR_i^{ideal}$ of the window $W_i$ is monitored in real time, and if $DR_i < DR_i^{ideal}$, the number of threads $N_i$ required by the window $W_i$ is set as a total number of threads in the system N; and if $DR_i \geq DR_i^{ideal}$, the number of thread required by the window $W_i$ is calculated according to $$N_i = \frac{QL_i}{T_{slo} - T_{io} - TW_i} \times T_{io}.$$

In the dynamic resources allocation system for guaranteeing tail latency SLO of latency-sensitive applications, wherein the module 2 comprises:

a module 36, wherein as for the window $W_i$, assuming that the i-$^{th}$ request en-queues at time $T_i$, the j-$^{th}$ request en-queues at time $T_j$, and the number of en-queuing requests within the time $T_j-T_i$ is $EQ_i$, the request de-queue rate $ER_i$ is calculated as $EQ_i/(T_j-T_i)$;

a module 37, wherein the request de-queue rate $DR_i$ of the window $W_i$ and the request en-queue rate $ER_{i+1}$ of the window $W_{i+1}$ are monitored in real time, and as for the window $W_i$, if $DR_i < ER_{i+1}$, the number of threads in the window $W_i$ is set as the total system thread N; and if $DR_i \geq ER_{i+1}$, the number of threads required by the window $W_i$ is calculated again according to $$N_i = \frac{QL_i}{T_{slo} \cdot T_{io} \cdot TW_i} \times T_{io}.$$

In the dynamic resources allocation for guaranteeing tail latency SLO of latency-sensitive application, wherein the thread group comprises a backup thread and a main thread, and when the main thread is blocked by underlying I/O operations, the backup thread is awakened to process requests on the queue.

The advantages of the present invention are as follows according to the above solution:

The present invention has the following effects compared with existing approaches:

(1) Analysis in principle: As for the latency-sensitive applications, the present invention combines the target SLO requirements thereof and the IO time obtained by performing profile on the storage device; as for request queue of the latency-sensitive applications, the present invention divides requests into windows, allocates thread resources to windows, and performs dynamic allocations on the thread resources by monitoring the de-queue rate and the en-queue rate of the queue. Therefore, the present invention can timely deal with impact of underlying IO fluctuation on the tail latency during the request processing, avoiding the situation where the request latency does not meet the target SLO requirements. In addition, the use of the backup thread can, on the one hand, avoid delayed service for subsequent requests caused by blockage of the underlying IO, and on the other hand, take full advantage of io_wait time of the CPU, which means that the system resources are fully used. During system operation, the dynamic thread resources allocation method guarantees the target requirements of the latency-sensitive applications, and allows the remaining thread resources to serve the requests of the batch-job applications, which improves the system resource utilization rate with a win-win effect.

(2) Analysis in method implementation and evaluation: The key technology of the present invention is implemented and compared with the Ceph system (which configures priority mode thereof). The evaluation shows that in the scenario with mixed application loads (i.e., the latency-sensitive applications are consolidated with the batch-job applications), when compared with Ceph, the method of the present invention can avoid interference from the batch-job applications and guarantee the target tail latency requirements of the latency-sensitive applications. Measured data are as shown in Table 1 below.

TABLE 1

Effects of the method of the present invention (target $99.9^{th}$ tail latency of the latency-sensitive applications is 3.8 ms)

| Scenario | System | Tail latency of latency-sensitive applications ($99.9^{th}$) | Bandwidth of batch-job applications |
|---|---|---|---|
| Separate deployment of latency-sensitive applications | Ceph (priority) | 3.79 ms | — |
| Consolidating the latency-sensitive applications with the batch-job applications | Ceph (priority) Method of the present invention | 4.17 ms 3.16 ms | 534 MB/s 536 MB/s |

As shown in Table 1, in the scenarios that the latency-sensitive applications are consolidated with the batch-job applications, if the $99.9^{th}$ tail latency requirement of the latency-sensitive applications is set as 3.8 ms (i.e., the tail latency achieved when the latency-sensitive applications are deployed separately), and the IO time of requests is set as 1.5 ms, the method of the present invention can guarantee that the tail latency ($99.9^{th}$) of the latency-sensitive applications meets the target requirements, and enables the bandwidth of the batch-job applications to maintain at a relatively high level.

DETAILED DESCRIPTION

A basic environment for implementing the present invention needs to meet the following three prerequisites:

Prerequisite 1: Different types of queues are divided according to different types of applications, and the corresponding requests thereof enter different types of queues respectively. That is, the applications are divided into K types, K queues are created respectively, and the requests of K types enter K queues respectively. Through queue division, the requests of the same type are located in a same queue, thus avoiding competition and interference of different types of requests in queue operations. In specific embodiments, there are two types of requests accessing the system, namely latency-sensitive requests and batch-job application requests, therefore the requests are divided into two types of queues, namely latency-sensitive queues and batch-job queues. Different types of requests enter different types of queues.

Prerequisite 2: As for division of logical thread resources, different types of queues correspond to different thread groups (composed of a plurality of thread groups), one thread group can only process the requests on corresponding queue thereof, and the number of threads in the thread group corresponding to different types of queues is different. With division of the logical thread resources, interference introduced by competition for thread resources by different types of requests can be avoided.

Prerequisite 3: The logical thread resources are bound with physical CPU cores, and each physical CPU core is bound with one main thread and L backup threads. The logical thread resources are bound with the physical resources, avoiding the interference introduced by the competition for the physical CPU by a plurality of threads. In addition, in the physical CPU core, the main thread and the backup threads use resources in a time-division multiplexing (TDM) manner, thus avoiding interference and improving utilization rate. The main thread and the backup threads share the CPU resources. When the main thread is performing underlying IO operations, the main thread will give up the CPU. At this time, the backup threads can use the CPU resources and schedule the requests, which can be understood as the TDM of CPU resources.

Based on the above three prerequisites, the present invention claims the following protection points for latency-sensitive application queues:

Protection point 1: a method for initially allocating the number of threads required by a window $W_i$ which provides protection from the following three aspects:

Protection point 1-1: a method for determining the window $W_i$ in which requests of the latency-sensitive application queues are divided into windows, when a first request in the queue is processed, all requests in the current queue are considered as a window, and assuming that the window is $W_i$, subsequent incoming requests that enter into queue belong to the next window $W_{i+1}$, and so on, and each window is determined during request processing. The technical effect is that the queue requests are managed in units of window, enabling the thread resources of the system to be managed with a finer granularity, making the thread models more flexible and meeting the system target requirements.

Protection point 1-2: a method for maintaining state information of the window $W_i$, in which the following information is maintained during lifecycle of the window $W_i$: $\{ER_i, QL_i, TW_i, DR_i\}$, where $ER_i$ is a request en-queue rate of the window $W_i$, $QL_i$ is size of the window $W_i$ (number of requests in the window), $TW_i$ is wait time (interval from when the first request in the window $W_i$ en-queues to when the request is processed), $DR_i$ is a request de-queue rate of the window $W_i$, and $DR_i^{ideal}$ is an ideal de-queue rate of the window $W_i$, and if the queue requests de-queue at the ideal de-queue rate, the requests in the queue can meet the latency SLO requirements in case of no exceptional situation, The value will be used for comparison when the number of threads in the window is adjusted subsequently, when size of the window $W_i$ is not determined, and $DR_i \equiv 0$ and $ER_i > 0$, there are still requests to en-queue at this time; once the size of the window $W_i$ is determined, and $ER_i \equiv 0$ and $DR_i > 0$, the requests in the window will de-queue and be processed. The technical effect is that the state information of the window $W_i$ is maintained during the system operation, which provides supports for dynamic allocation of the thread resources.

Protection point 1-3: According to requirements of latency-sensitive workloads $T_{slo}$ (target tail latency of the latency-sensitive applications), $T_{io}$ is I/O time of the requests (this value is obtained by performing an offline profile on a storage device); by combining the state information maintained for the window $W_i$, $N_i$ threads are allocated for the window $W_i$ when the window is created (i.e., $N_i$ physical CPU cores, $N_i$ main threads, each of the main threads has L backup threads), and $N_i$ is estimated according to the following equation:

$$N_i = \frac{QL_i}{T_{slo} \cdot T_{io} \cdot TW_i} \times T_{io}.$$

Assuming that the total number of threads in the system (a system running on the service node) is N (excluding the backup threads), the remaining $N-N_i$ threads will serve the batch-job applications. The technical effect is that the number of threads is allocated to the latency-sensitive applications on demand in units of window, and the remaining threads are used to serve the requests of the batch-job applications to make full use of the system resources.

Protection point 2: a method for dynamically adjusting threads in the window $W_i$ based on information maintained for the window $W_i$, which provides protection from the following three aspects:

Protection point 2-1: a method for monitoring the de-queue rate $DR_i$ of the window $W_i$, as for the window $W_i$, the de-queue rate $DR_i$ and the en-queue rate $ER_i$ will not be greater than zero at the same time, and once the size of the window $W_i$ is determined, as for $W_i$, $ER_i \equiv 0$, and at the same time, the requests start to de-queue and are processed. As for the window $W_i$, assuming that a i-$^{th}$ request de-queues at time $T_i$, a j-$^{th}$ request de-queues at time $T_j$, and the number of de-queuing requests within time $T_j - T_i$ is $DQ_i$, the de-queue rate $DR_i$ of the requests is calculated as $DQ_i/(T_j - T_i)$. The technical effect is that monitoring the request de-queue rate of the window $W_i$ is beneficial to determining whether the allocated threads are sufficient and whether there is a need to allocate again.

Protection point 2-2: a method for calculating ideal de-queue rate $DR_i^{ideal}$ of the window $W_i$, as for the window $W_i$, once the size of the window is determined, by combining the target tail latency requirements $T_{slo}$ and the IO time $T_{io}$ of the requests, the ideal de-queue rate $DR_i^{ideal}$ of the window $W_i$ is $QL_i/(T_{slo} - T_{io} - TW_i)$, and if the window $W_i$ de-queues and processes requests in strict accordance with $DR_i^{ideal}$, the latency of requests in the window $W_i$ will not exceed the target tail latency requirements.

Protection point 2-3: A difference between the request de-queue rate $DR_i$ and the ideal de-queue rate $DR_i^{ideal}$ of the window $W_i$ is monitored in real time, and the thread resources required by the window $W_i$ are adjusted dynamically. A method for adjusting thread is as follows: for the window $W_i$, if $DR_i < DR_i^{ideal}$, setting the number $N_i$ of threads required in the window $W_i$ to N, that is, a total number of threads in the system; and if $DR_i \geq DR_i^{ideal}$, calculating the number of threads required by the window again according to $$N_i = \frac{QL_i}{T_{slo} \cdot T_{io} \cdot TW_i} \times T_{io} W_i.$$

At the same time, in the process of dynamically adjusting threads, the remaining $N-N_i$ threads are used to serve the batch-job applications. The technical effect is that when the window $W_i$ is abnormal due to underlying IO requests, threads are added dynamically in real time to avoid the situation where the tail latency of the requested latency cannot meet the target requirements.

Protection point 3: a method for dynamically adjusting threads in the window $W_i$ by combining information of a window $W_{i+1}$ and the window $W_i$, which provides protection from the following two aspects:

Protection point 3-1: a method for monitoring en-queue rate $ER_i$ of the window $W_i$, as for the window $W_i$, if there are still requests to en-queue, the processing of requests in the window $W_{i-1}$ is not finished, and the size of the window $W_i$ has yet to be determined at this time, as for the window $W_i$, assuming that the i-$^{th}$ request en-queues at time $T_i$, the j-$^{th}$ request de-queues at time $T_j$, the number of requests en-queuing within time $T_j - T_i$ is $EQ_i$, and the en-queue rate $ER_i$ of the requests is $EQ_i/(T_j - T_i)$. The technical effect is that monitoring the request en-queue rate of the window $W_i$ is beneficial to determining whether the allocated threads in the window $W_{i-1}$ are sufficient and whether there is a need to allocation again.

Protection point 3-2: real-time monitoring of the request de-queue rate $DR_i$ of the window $W_i$ and the request en-queue rate $ER_{i+1}$ of the window $W_{i+1}$, where the thread resources required by the window $W_i$ are adjusted dynamically. The method for adjusting threads is as follows: for the window $W_i$, if $DR_i < ER_{i+1}$, setting the number of threads in the window $W_i$ to N, that is, the total number of threads in the system; and if $DR_i \geq ER_{i+1}$, calculating the number of threads required by the window again according to $$N_i = \frac{QL_i}{T_{slo} \cdot T_{io} \cdot TW_i} \times T_{io} W_i.$$

At the same time, in the process of dynamically adjusting threads, the remaining $N-N_i$ threads are used to serve the batch-job applications. The technical effect is to avoid the situation where the request latency cannot meet the target requirements due to burst of the request in the subsequent window.

Protection point 4: a method for using and scheduling backup threads, where for a physical CPU core, when the main thread processes the requests on the queue, the backup threads are in a blocking state, and when the main thread is blocked by underlying I/O operations, the backup threads will be awakened to process the requests on the queue. Technical effect is to prevent the main thread from being blocked by the underlying I/O for a long time which results in failure to serve the subsequent requests in time, and to improve the system resource utilization rate.

When researching resources allocation strategy and request processing thread model in storage server nodes of the storage system, the inventors found that the defect in existing approaches is caused by resource competition and inflexibility of the thread model, which specifically lies in that different types of requests may share the logical thread resources, thus causing competition. Competition exists because the logical thread resources share physical resources, and there is randomness in the management and control of the thread resources. The inventors investigated reasons of resource competition and inflexible thread scheduling in the system and found that the solution to the defect can be achieved by dividing the resources (queue/thread/physical CPU) and combining with a dynamic thread resources allocation method. The whole process of the solution is described below.

In a storage server node of a distributed storage system, different types of requests are isolated by different queues, that is, a method for dividing request queues of the latency-sensitive applications. In the storage server node of the distributed storage system, that is, the requests of latency-sensitive applications and batch-job applications are located on different IO queues. A relationship between the logical thread resources and the physical CPU resources is clarified to guarantee that the logical threads will not migrate on the physical CPU cores during the system operation. A main thread and multiple backup threads run on each physical CPU core, the main thread processes the queue requests, and the backup threads are blocked, avoiding disordered competition for a plurality of CPU cores by a plurality of threads. The thread resources are divided, and different types of queues correspond to different thread resources. The process of thread resource division and dynamic adjustment is described in detail later.

Based on the above prerequisites, the present invention provides a method for dynamically adjusting thread resources in a window according to tail latency SLO requirements, queue request queuing condition and request IO latency in the unit of window for latency-sensitive application requests in a storage server node, and using the remaining resources for processing batch-job application requests.

Definition of window: When a first request in a queue is processed, all requests in the current queue are regarded as a window. Subsequent incoming requests that enter into queue belong to a next window.

During the system operation, the number of threads required to process requests in the window will be dynamically adjusted according to the target tail latency SLO, information in the window, IO time of the requests and other information to guarantee that the requests in the window meet the target SLO requirements. Parameters involved in the adjustment process are as shown in Table 2.

TABLE 2

| Parameters and description | | | |
|---|---|---|---|
| Parameter | | Description | Calculation method |
| Input parameters | $T_{slo}$ | Tail latency SLO (e.g., $99.9^{th}$-latency) | Input parameter, target requirement |
| | $T_{io}$ | IO time of a single request | A fixed value, obtained by offline profile of service time required for the storage device to process IO |
| Parameters related to the window $W_i$ | $QL_i$ | Queue length of requests in the window $W_i$, also the queue length when the first request in the window is processed | Statistical value |
| | $TW_i$ | Wait time of the window $W_i$ namely, the time from when the first request in the window en-queues to when the window starts to be processed. | Statistical value |
| | $DQ_i$ | Number of requests de-queuing within time T in the window $W_i$. | Statistical value |
| | $DR_i^{ideal}$ | Ideal de-queue rate of the requests in the window $W_i$ per unit time, where the requests in the window $W_i$ de-queue according to the ideal de-queue rate, and when there is no exceptional situation, the request tail latency in the window can meet the target SLO requirements. | $\dfrac{QL_i}{T_{slo} - T_{io} - TW_i}$ |
| | $DR_i$ | Real de-queue rate of the requests in the window $W_i$ per unit time | $\dfrac{DQ_i}{T}$ |
| | $EQ_i$ | Number of requests en-queuing in the window $W_i$ within time T. | Statistical value |
| | $ER_i$ | Real en-queue rate of the requests in the window $W_i$ per unit time | $\dfrac{EQ_i}{T}$ |
| | $N_i$ | Numbers of threads required by the window $W_i$ | Dynamic changes (see the allocation process for details) |

Figure 4:
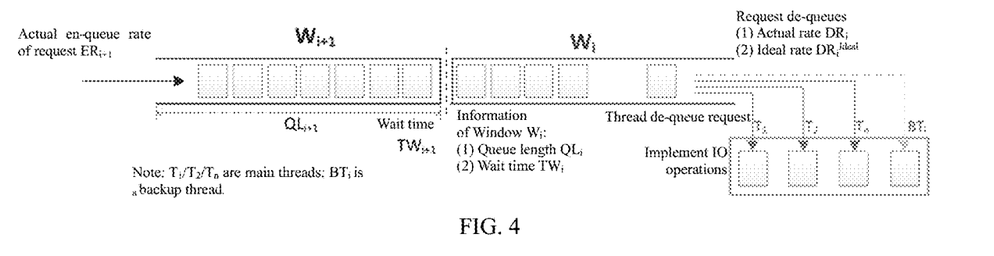
FIG. 4 is a schematic diagram of thread allocation.

Assuming that the total number of available threads in the storage node is N, $N_i \leq N$ is defined when the threads are allocated subsequently and dynamically adjusted for a latency-sensitive request queue in units of window, and the remaining $N-N_i$ threads are allocated to a batch-job request queue for request processing. Obviously, the wait time of the first window in the system is 0. Time to process the window $W_i$ affects the wait time of the window $W_{i+1}$. As for the window $W_i$, the request en-queue rate $ER_i$ and de-queue rate $DR_i$ thereof cannot be greater than zero at the same time. Once the size of the window $W_i$ is determined, and $DR_i=0$ and $ER_i>0$, there are still requests to en-queue. Once the size of the window $W_i$ is determined, and $ER_i=0$ and $DR_i>0$, at this time, the requests in the window will de-queue and be processed. A schematic diagram of thread allocation is as shown in FIG. 4.

The dynamic adjustment process of the threads in the window $W_i$ is as follow:

(1) The number of threads required when the window $W_i$ is created:

When the requests in the window $W_i$ starts to be processed, the number of threads $N_i$ required by the window is calculated by Equation 1, and corresponding threads will be allocated to the window $W_i$ and the requests start to be processed.

$$N_i = \frac{QL_i}{T_{slo} - T_{io} - TW_i} \times T_{io} \quad \text{(Equation 1)}$$

(2) Second allocation of the number of threads in the window $W_i$:

When the window is created, the number of threads required by the window is determined by using (Equation 1). According to Equation 1, $T_{io}$ selects the fixed value obtained by the profile on the storage device. Apparently, $T_{io}$ is essential to the determination of the number of threads. However, as for the storage device, IO latency thereof is not fixed. When the requests in the window are processed, the real IO latency of the requests varies greatly from the $T_{io}$, and when the number of threads calculated by the fixed $T_{io}$ is used to process requests in the window, the target requirements $T_{slo}$ may not be met. Therefore, the number of threads required by the window is allocated in real time during the processing of the requests in the window. The following (2-1), (2-2) and (2-3) are respectively described for three different cases.

(2-1) When the current window $W_i$ processes the requests, the real de-queue rate $DR_i$ and the ideal de-queue rate $DR_i^{ideal}$ of the current window $W_i$ are monitored in real time. If $DR_i < DR_i^{ideal}$ is found, that is, the real de-queue rate is less than the ideal de-queue rate, an exception occurs during the processing of the requests in the window $W_i$ and a cause thereof is that the IO of individual request/some requests in the window is too long (longer than the $T_{io}$ previously set), which inevitably causes excessive processing time of the window $W_i$, thus affecting the next window $W_{i+1}$. In this case, the number of threads in the window $W_i$ will be allocated twice. Once $DR_i < DR_i^{ideal}$ is found, all available threads in the system are allocated to the window to increase the real de-queue rate $DR_i$ and prevent the window $W_i$ from affecting the next window $W_{i+1}$ due to excessive processing time thereof. At the same time, $DR_i$ will be monitored constantly when the requests in the window $W_i$ are processed subsequently and compared with $DR_i^{ideal}$. If $DR_i \geq DR_i^{ideal}$ is found, the number of threads required by the window $W_i$ will be calculated according to Equation 1 and the corresponding threads are allocated.

(2-2) The current window $W_i$ monitors the request en-queue rate $ER_{i+1}$ of the next window $W_{i+1}$ while processing the requests. If $ER_{i+1} > DR_i$ is found, that is, the de-queue rate of the current window $W_i$ is less than the en-queue rate of the next window $W_{i+1}$, which indicates that request burst may have occurred in the next window $W_{i+1}$, thus requiring more threads to process the requests. As the number of threads required by the next window $W_{i+1}$ is relevant to the processing time of the current window $W_i$, the processing time of the current window $W_i$ should be reduced to ensure that the requests in the next window $W_{i+1}$ can meet the tail latency requirements. Therefore, once $ER_{i+1} > DR_i$ is found, all available threads in the system are allocated to the window $W_i$ to increase the real de-queue rate $DR_i$ and shorten the wait time of the next window $W_{i+1}$. At the same time, $DR_i$ and $ER_{i+1}$ will be monitored constantly when the requests in the window are processed subsequently. If $DR_i \geq ER_{i+1}$ is found, the number of threads required by the window $W_i$ will be calculated according to Equation 1 and the corresponding threads are allocated.

(2-3) Introduction of "backup threads": When the threads of the current window $W_i$ perform the underlying IO operation and the time of the IO operation exceeds the set $T_{io}$, the subsequent requests cannot be scheduled and processed. This increases the processing time of the current window $W_i$, which means that the wait time of the next window $W_{i+1}$ becomes longer. As the threads in the window $W_i$ are performing the IO operations, the CPU core is in io_wait state at this time, which is obviously a waste of resources. For this reason, a backup thread (BT) is configured for the thread on each CPU core (called main thread). The backup thread will start processing scheduling requests when the main thread on the same CPU core is monitored to perform the underlying IO operations and the operations do not end after the set $T_{io}$ for the device. Generally, the backup thread is in a sleep mode. The introduction of the "backup thread" can reduce the processing time of the window $W_i$ and improve the resource utilization rate of the CPU. After the "backup thread" processes a request, the "backup thread" performs the above monitoring again, and enters different processes (enter the sleep mode or continue to process the requests) according to monitoring results.

The above (2-1) and (2-3) are two different ways to deal with exceptions occurred in the current window request. In (2-3), when an exception is found by monitoring during the processing of the request IO, which means that the actual IO time of the current request exceeds the set $T_{io}$, the idle io_wait time of the CPU is fully used by triggering the "backup thread" to de-queue the requests in a timely manner to reduce queuing time of subsequent requests in the current window. When an exception occurs in the requests in the window, even if the "backup thread" is triggered to process the requests, which can ease the queuing time of subsequent requests to a certain extent, the de-queue rate of the requests in the current window will be seriously affected if an exception occurs in the underlying device and thus the IO of the requests processed by the "backup thread" also becomes abnormal. If a de-queue rate less than the ideal de-queue rate significantly affects the requests in the next window, the thread resources in the current window are not sufficient, and the thread resources in the window are needed at this time, that is, the process described in the above (2-1). The above (2-2) allocates the number of threads in the current window by predicting the number of requests in the next window. The requests in the next window need to wait to be processed until the requests in the current window have been processed. If the number of requests in the next window increases sharply (the burst occurs, causing the en-queue rate to exceed the de-queue rate), the requests in the next window will not be processed in time, thus the target tail latency requirements will be exceeded. At this time, the method described in (2-2) is used to allocate the number of threads required by the current window, quickly process the requests in the current window, and shorten the wait time of the requests in the next window.

To make the above features and effects of the present invention more clear and understandable, the detailed description is made as follows in the manner of embodiments and in combination with attached drawings.

Figure 5:
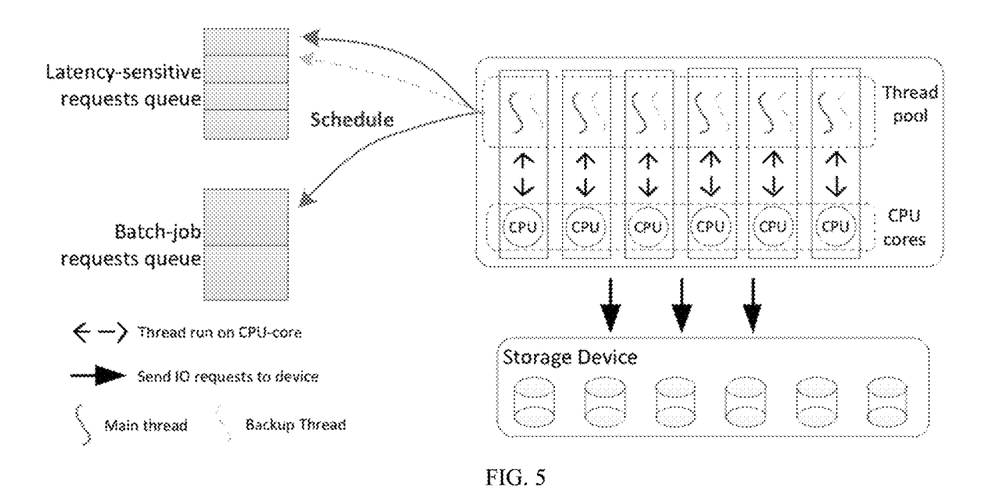
FIG. 5 is a schematic diagram of queue, thread and CPU binding.

In a storage server node of a distributed storage system, latency-sensitive application requests and batch-job application requests are respectively located in different queues (latency-sensitive-queue and batch-job-queue), and two threads (one main thread and one backup thread) run on each CPU core, as shown in FIG. 5. The key of the technical solution of the present invention is to dynamically allocate thread resources in units of window according to the request queue of the latency-sensitive applications and in combination with tail latency SLO requirements thereof and the IO time of the requests.

Figure 6:
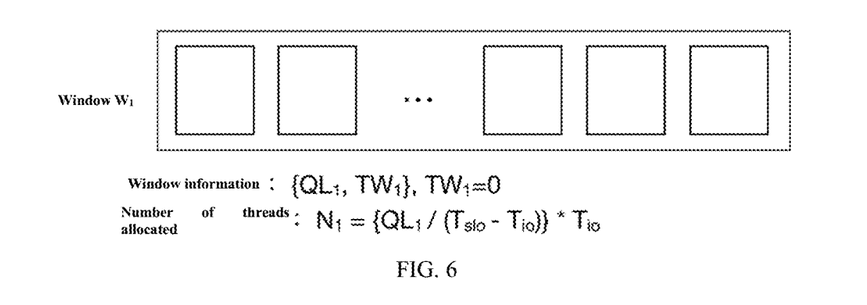
FIG. 6 is a schematic diagram of a first window.

A total number of available thread resources in the storage node is assumed to be N. The tail latency SLO of the latency-sensitive applications is $T_{slo}$, and the IO time of the requests thereof is $T_{io}$ (acquiring the profile of the storage device). The specific implementation process of the technical solution of the present invention is as follows (all the following is for the request queues of the latency-sensitive applications):

(1) Determination of the Windows (1-1) A first window (as shown in FIG. 6): When starting to process the first request in the system, all requests in the current queue belong to a window $W_1$ and the size of $W_1$ is determined as the number of requests, and obviously $TW_1=0$. At this time, the number of threads required by the first window is:

$$N_1 = \frac{QL_1}{T_{slo} - T_{io}} \times T_{io}$$

(1-2) A window $W_i(i>1)$: The size of the window is determined when the first request in the window starts to be processed. Therefore, after the time that the window $W_1$ is created, subsequent incoming requests belong to the window $W_2$. When the first request in the window $W_2$ is processed, window $W_2$ is created and its size is determined as the number of requests within $W_2$, and so on, each window is created one by one.

If the first request in the window $W_i$ en-queues at time $T_0$, and the first request in the window $W_i$ is processed at time $T_1$, wait time of the window $W_i$ is $TW_i=T_1-T_0$. The wait time of the window $W_i$ is directly related to the speed at which the requests are processed in the window $W_{i-1}$.

For the window $W_i$ with size yet to be determined, request en-queue rate $ER_i$ thereof can be calculated in real time, and both the de-queue rate and the ideal de-queue rate thereof are constant to be zero ($DR_i \equiv DR_i^{ideal} \equiv 0$).

As for the window $W_i$ that is being processed, the wait time thereof $TW_i$ can be obtained statistically, the request en-queue rate thereof is always zero ($ER_i \equiv 0$), the de-queue rate thereof $DR_i$ can be calculated in real time, and the ideal de-queue rate $DR_i^{ideal}$ thereof is a certain value ($QL_i/(T_{slo}-T_{io}-TW_i)$) and is determined when the size of the window is determined.

(2) Dynamic allocation of threads in the window $W_i$

When processing the requests in the window $W_i$, the following three conditions will be monitored in real time and dynamic thread scheduling will be carried out.

(i) Does the time for the main thread to process the underlying IO operations of the requests exceed the set $T_{io}$?

(ii) Is the real de-queue rate $DR_i$ of the requests in the current window $W_i$ less than the ideal de-queue rate $DR_i^{ideal}$ of the requests?

(iii) Is the real de-queue rate $DR_i$ of the requests in the current window $W_i$ less than the request en-queue rate $ER_{i+1}$ of the next window $W_{i+1}$?

Figure 7:
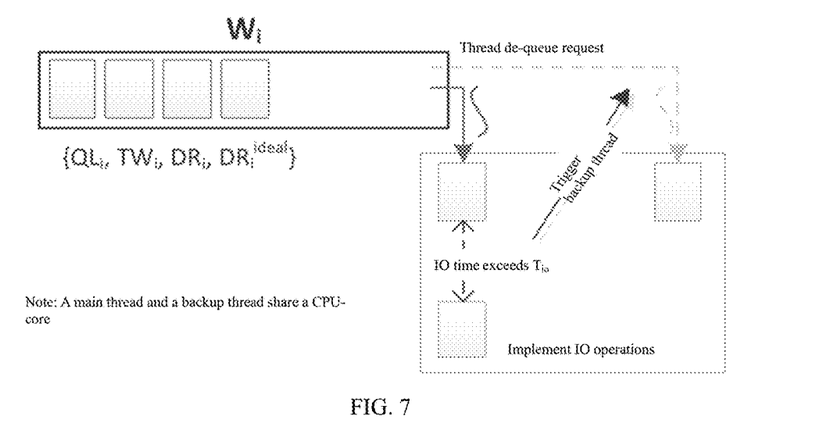
FIG. 7 is a schematic diagram of triggering a backup thread.

In case (2-i), if the IO operation time of the requests exceeds the set $T_{io}$, the backup thread will be awakened to process the requests, thus shortening the wait time of subsequent requests in the current window. After the backup thread finishes the processing of a request, the backup thread will re-check that whether the current IO of the main thread exceeds the set $T_{io}$. If yes, the backup thread will de-queue the requests again and process the requests. as shown in FIG. 7.

Figure 8:
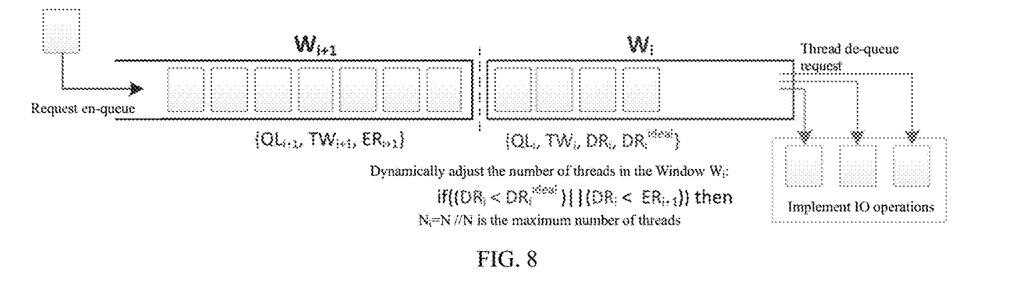
FIG. 8 is a schematic diagram of dynamic allocation of the number of threads in a window $W_i$.

In cases (2-ii) and (2-iii), that is, the real de-queue rate of the requests $DR_i$ in the current window $W_i$ is less than the ideal de-queue rate of the requests $DR_i^{ideal}$, or the real de-queue rate $DR_i$ of the requests in the current window $W_i$ is less than the request en-queue rate $ER_{i+1}$ of the next window $W_{i+1}$ (as shown in FIG. 8), that is, $DR_i<DR_i^{ideal}$ or $DR_i<ER_{i+1}$, all the available threads in the system are allocated to the current window to speed up the request processing in the current window, until $DR_j \geq DR_j^{ideal}$ and $DR_j \geq ER_{i+1}$, the threads in the current window are reduced to an initial thread value of the window.

The following is a system embodiment corresponding to the above method embodiment, and the embodiment can be implemented in cooperation with the above embodiment. The relevant technical details mentioned in the above embodiment are still valid in the embodiment, and are not repeated here for brevity. Accordingly, the relevant technical details mentioned in the embodiment can also be applied in the above embodiment.

The present invention also provides a dynamic resources allocation system for guaranteeing tail latency SLO of latency-sensitive applications, comprising:

a module 1, wherein a plurality of request queues is created in a storage server node of a distributed storage system with different types of requests located in different queues, and thread groups are allocated to the request queues according to logical thread resources of the service node and target tail latency requirements of the latency-sensitive applications with the thread group of each request queue bound with physical CPU resources of the service node;

a module 2, wherein queue requests of the latency-sensitive applications within the storage server node are divided into windows, the thread resources (thread group) are allocated by combining window information with the target tail latency requirements of latency-sensitive queues, request processing rate in the window and arrival rate of subsequent requests are monitored in real time, and the thread resources of the latency-sensitive queues are dynamically adjusted in real time to guarantee the target tail latency requirements, with remaining thread resources serving other applications; and a module 3, wherein a client sends an application's requests to the storage server node; the storage server node stores the application's requests in a request queue corresponding to its type, a thread group allocated for the current queue processes the application access request, and responses are sent to the client.

In the dynamic resources allocation system for guaranteeing tail latency SLO of latency-sensitive applications, wherein the access type comprises an access latency-sensitive type, and the module 3 comprises:

a module 31, wherein the request queue of the access latency-sensitive type is set as a latency-sensitive queue, the application access requests in the latency-sensitive queue are divided into windows, all requests in the current latency-sensitive queue are treated as a window $W_i$ when a first request in the latency-sensitive queue is processed, and the first request that subsequently enters the sensitive queue is considered as the first request of a next window $W_{i+1}$; and a module 32, wherein the following information is maintained throughout the lifecycle of the window $W_i$: {$ER_i$, $QL_i$, $TW_i$, $DR_i$}, where $ER_i$ is a request en-queue rate of the window $W_i$, $QL_i$ is size of the window $W_i$, $TW_i$ is wait time, and $DR_i$ is a request de-queue rate of the window $W_i$; when size of the window $W_i$ is not determined, and $DR_i \equiv 0$ and $ER_i > 0$, requests en-queue at this time; once the size of the window $W_i$ is determined, and $ER_i \equiv 0$ and $DR_i > 0$, at this time, the requests in the window $W_i$ de-queue and are processed by the allocated thread group.

In the dynamic resources allocation system for guaranteeing tail latency SLO of latency-sensitive applications, wherein the module 3 comprises:

a module 33, wherein according to the target tail latency $T_{slo}$ of the latency-sensitive applications and I/O time $T_{io}$ of the request, and in combination with the state information maintained for the window $W_i$, $N_i$ threads are allocated to the window $W_i$ when the window is created, and $N_i$ is estimated according to the following equation:

$$N_i = \frac{QL_i}{T_{slo} \cdot T_{io} \cdot TW_i} \times T_{io}.$$

In the dynamic resources allocation system for guaranteeing tail latency SLO of latency-sensitive applications, wherein the module 2 comprises:

a module 34, wherein as for the window $W_i$, assuming that a i-$^{th}$ request de-queues at time $T_i$, a j-$^{th}$ request de-queues at time $T_j$, and the number of de-queuing requests within time $T_j - T_i$ is $DQ_i$, a de-queue rate $DR_i$ of the requests is calculated as $DQ_i/(T_j-T_i)$, and an ideal de-queue rate $DR_i^{ideal}$ of the window $W_i$ is calculated as $QL_i/(T_{slo}-T_{io}-TW_i)$; and a module 35, wherein a difference between the request de-queue rate $DR_i$ and the ideal de-queue rate $DR_i^{ideal}$ of the window $W_i$ is monitored in real time, and if $DR_i < DR_i^{ideal}$, the number of threads $N_i$ required by the window $W_i$ is set as a total number of threads in the system N; and if $DR_i \geq DR_i^{ideal}$, the number of threads required by the window $W_i$ is calculated according to $$N_i = \frac{QL_i}{T_{slo} \cdot T_{io} \cdot TW_i} \times T_{io}.$$

In the dynamic resources allocation system for guaranteeing tail latency SLO of latency-sensitive applications, wherein the module 2 comprises:

a module 36, wherein as for the window $W_i$, assuming that the i-$^{th}$ request en-queues at time $T_i$, the j-$^{th}$ request en-queues at time $T_j$, and the number of en-queuing requests within the time $T_j - T_i$ is $EQ_i$, the request de-queue rate $ER_i$ is calculated as $EQ_i/(T_j-T_i)$; and a module 37, wherein the request de-queue rate $DR_i$ of the window $W_i$ and the request en-queue rate $ER_{i+1}$ of the window $W_{i+1}$ are monitored in real time, and as for the window $W_i$, if $DR_i < ER_{i+1}$, the number of threads in the window $W_i$ is set as the total system thread N; and if $DR_i \geq ER_{i+1}$, the number of threads required by the window $W_i$ is calculated again according to $$N_i = \frac{QL_i}{T_{slo} \cdot T_{io} \cdot TW_i} \times T_{io}.$$

In the dynamic resources allocation system for guaranteeing tail latency SLO of latency-sensitive application, wherein the thread group comprises a backup thread and a main thread, and when the main thread is blocked by underlying I/O operations, the backup thread is awakened to process requests on the queue.

INDUSTRIAL APPLICABILITY

The present invention proposes a dynamic resources allocation method and system for guaranteeing latency SLO of latency-sensitive applications. A plurality of request queues is created in a storage server node of a distributed storage system with different types of requests located in different queues, and thread groups are allocated to the request queues according to logical thread resources of the storage server node and target tail latency requirements, and thread resources are dynamically allocated in real time, and the thread group of each request queue is bound to physical CPU resources of the service node. The client sends an application's requests to the storage server node; the storage server node stores the request in a request queue corresponding to its type, uses the thread group allocated for the current queue to process requests, and sends responses to the client. The present invention ensures that the tail latency of the latency-sensitive applications meets target requirements, and allows bandwidth of batch-job applications to be maintained at a high level.

The invention claimed is:

1. A dynamic resources allocation method for guaranteeing tail latency SLO of latency-sensitive applications, comprising the following steps:

step 1: creating a plurality of request queues in a storage server node of a distributed storage system with different types of requests located in different queues, and allocating thread groups to the request queues according to logical thread resources of the service node and target tail latency requirements of the latency-sensitive applications with the thread group of each request queue bound with physical CPU resources of the storage server node;

step 2: dividing queue requests of the latency-sensitive applications within the storage server node into windows, allocating the thread resources by combining window information with the target tail latency requirements of latency-sensitive queues, monitoring request processing rate in the window and arrival rate of subsequent requests in real time, and dynamically adjusting the thread resources of the latency-sensitive queues in real time to guarantee the target tail latency requirements, with remaining thread resources serving other applications; and step 3: sending an application's requests to the storage server node by a client; storing the application's requests in a request queue corresponding to its type, processing the application's requests using a thread group allocated for the current queue, and sending responses to the client;

wherein the access type comprises an access latency-sensitive type, and the step 3 comprises the following steps:

step 31: setting the request queue of the access latency-sensitive type as a latency-sensitive queue, dividing the application's requests in the latency-sensitive queue into windows, treating all requests in the current latency-sensitive queue as a window $W_i$ when a first request in the latency-sensitive queue is processed, and subsequent incoming requests that enter into queue belong to the next window $W_{i+1}$; and step 32: maintaining the following information throughout lifecycle of the window $W_i$: $\{ER_i, QL_i, TW_i, DR_i\}$, where $ER_i$ is a request en-queue rate of the window $W_i$, $QL_i$ is size of the window $W_i$, $TW_i$ is wait time, and $DR_i$ is a request de-queue rate of the window $W_i$; when size of the window $W_i$ is not determined, and $DR_i=0$ and $ER_i>0$, requests en-queue at this time; once the size of the window $W_i$ is determined, and $ER_i=0$ and $DR_i>0$, at this time, the requests in the window $W_i$ de-queue and are processed by the allocated thread group.

2. The dynamic resources allocation method for guaranteeing tail latency SLO of latency-sensitive applications according to claim 1, wherein the step 3 comprises:

step 33: according to the target tail latency $T_{slo}$ of the latency-sensitive applications and I/O time $T_{io}$ of the request, and in combination with state information maintained for the window $W_i$, when the window $W_i$ is created, allocating $N_i$ threads to the window, and estimating $N_i$ according to the following equation:

$$N_i = \frac{QL_i}{T_{slo} \cdot T_{io} \cdot TW_i} \times T_{io}.$$

3. The dynamic resources allocation method for guaranteeing tail latency SLO of latency-sensitive applications according to claim 2, wherein the step 3 comprises:

step 34: as for the window $W_i$, assuming that a i-$^{th}$ request de-queues at time $T_j$, a j-$^{th}$ request de-queues at time $T_j$, and the number of de-queuing requests within time $T_j-T_i$ is $DQ_i$, calculating a de-queue rate $DR_i$ of the requests as $DQ_i/(T_j-T_i)$, and ideal de-queue rate $DR_i^{ideal}$ of the window $W_i$ as $QL_i/(T_{slo}-T_{io}-TW_i)$; and step 35: monitoring a difference between the request de-queue rate $DR_i$ and the ideal de-queue rate $DR_i^{ideal}$ of the window $W_i$ in real time, if $DR_i<DR_i^{ideal}$, setting the number of threads $N_i$ required by the window $W_i$ as a total number of threads in the system N; and if $DR_i \geq DR_i^{ideal}$, calculating the number of threads required by the window $W_i$ according to $$N_i = \frac{QL_i}{T_{slo} \cdot T_{io} \cdot TW_i} \times T_{io}.$$

4. The dynamic resources allocation method for guaranteeing tail latency SLO of latency-sensitive applications according to claim 3, wherein the step 3 comprises:

step 36: as for the window $W_i$, assuming that the i-$^{th}$ request en-queues at time $T_i$, the j-$^{th}$ request en-queues at time $T_j$, and the number of en-queuing requests within the time $T_j-T_i$ is $EQ_i$, calculating the request de-queue rate $ER_i$ as $EQ_i/(T_j-T_i)$; and step 37: monitoring the request de-queue rate $DR_i$ of the window $W_i$ and the request en-queue rate $ER_{i+1}$ of the window $W_{i+1}$ in real time, as for the window $W_i$, if $DR_i<ER_{j+1}$, setting the number of threads in the window $W_i$ as the total system thread N; and if $DR_i \geq ER_{j+1}$, calculating the number of threads required by the window $W_i$ again according to $$N_i = \frac{QL_i}{T_{slo} \cdot T_{io} \cdot TW_i} \times T_{io}.$$

5. The window-based dynamic thread resources allocation method for guaranteeing tail latency SLO of latency-sensitive applications in a distributed storage system according to claim 4, wherein the thread group comprises a backup thread and a main thread, and when the main thread is blocked by underlying I/O operations, the backup thread is awakened to process requests on the queue.

6. A dynamic resources allocation system for guaranteeing tail latency SLO of latency-sensitive applications, comprising:

a module 1, wherein a plurality of request queues is created in a storage server node of a distributed storage system with different types of requests located in different queues, and thread groups are allocated to the request queues according to logical thread resources of the storage server node and target tail latency requirements of the latency-sensitive applications with the thread group of each request queue bound with physical CPU resources of the storage server node;

a module 2, wherein queue requests of the latency-sensitive applications within the storage server node are divided into windows, the thread resources (thread group) are allocated by combining window information with the target tail latency requirements of latency-sensitive queues, request processing rate in the window and arrival rate of subsequent requests are monitored in real time, and the thread resources of the latency-sensitive queues are dynamically adjusted in real time to guarantee the target tail latency requirements, with remaining thread resources serving other applications; and a module 3, wherein a client sends an application's requests to the storage node; the storage node stores the application access request in a request queue corresponding to its type, a thread group allocated for the current queue processes the application's requests, and responses are sent to the client;

wherein the access type comprises an access latency-sensitive type, and the module 3 comprises:

module 31, wherein the request queue of the access latency-sensitive type is set as a latency-sensitive queue, the application's requests in the latency-sensitive queue are divided into windows, all requests in the current latency-sensitive queue are treated as a window $W_i$ when a first request in the latency-sensitive queue is processed, and subsequent incoming requests that enter into queue are belong to the next window $W_{i+1}$; and a module 32, wherein the following information is maintained throughout the lifecycle of the window $W_i$: $\{ER_i, QL_i, TW_i, DR_i\}$, where $ER_i$ is a request en-queue rate of the window $W_i$, $QL_i$ is size of the window $W_i$, $TW_j$ is wait time, and $DR_i$ is a request de-queue rate of the window $W_i$; when size of the window $W_i$ is not determined, and $DR_i=0$ and $ER_i>0$, requests en-queue at this time; once the size of the window $W_i$ is determined, and $ER_i=0$ and $DR_i>0$, at this time, the requests in the window $W_i$ de-queue and are processed by the allocated thread group.

7. The dynamic resources allocation system for guaranteeing tail latency SLO of latency-sensitive applications according to claim 6, wherein the module 3 comprises:

a module 33, wherein according to the target tail latency $T_{slo}$ of the latency-sensitive applications and I/O time $T_{io}$ of the request, and in combination with the state information maintained by window $W_i$, $N_i$ threads are allocated to the window $W_i$ when the window is created, and $N_i$ is estimated according to the following equation:

$$N_i = \frac{QL_i}{T_{slo} \cdot T_{io} \cdot TW_i} \times T_{io}.$$

8. The dynamic resources allocation system for guaranteeing tail latency SLO of latency-sensitive applications according to claim 7, wherein the module 2 comprises:

a module 34, wherein as for the window $W_i$, assuming that a i-$^{th}$ request de-queues at time $T_i$, a j-$^{th}$ request de-queues at time $T_j$, and the number of de-queuing requests within time $T_j-T_i$ is $DQ_i$, a de-queue rate $DR_i$ of the requests is calculated as $DQ_i/(T_j-T_i)$, and an ideal de-queue rate $DR_i^{ideal}$ of the window $W_i$ is calculated as $QL_i/(T_{slo}-T_{io}-TW_i)$; and a module 35, wherein a difference between the request de-queue rate $DR_i$ and the ideal de-queue rate $DR_i^{ideal}$ of the window $W_i$ is monitored in real time, and if $DR_i<DR_i^{ideal}$, the number of threads $N_i$ required by the window $W_i$ is set as a total number of threads in the system N; and if $DR_i \geq DR_i^{ideal}$, the number of threads required by the window $W_i$ is calculated according to $$N_i = \frac{QL_i}{T_{slo} \cdot T_{io} \cdot TW_i} \times T_{io}.$$

9. The dynamic resources allocation system for guaranteeing tail latency SLO of latency-sensitive applications according to claim 8, wherein the module 2 comprises:

a module 36, wherein as for the window $W_i$, assuming that the i-$^{th}$ request en-queues at time $T_i$, the j-$^{th}$ request en-queues at time $T_j$, and the number of en-queuing requests within the time $T_j-T_i$ is $EQ_i$, the request de-queue rate $ER_i$ is calculated as $EQ_i/(T_j-T_i)$; and a module 37, wherein the request de-queue rate $DR_i$ of the window $W_i$ and the request en-queue rate $ER_{i+1}$ of the window $W_{i+1}$ are monitored in real time, and as for the window $W_i$, if $DR_i<ER_{i+1}$, the number of threads in the window $W_i$ is set as the total system thread N; and if $DR_i \geq ER_{i+1}$, the number of threads required by the window $W_i$ is calculated again according to $$N_i = \frac{QL_i}{T_{slo} \cdot T_{io} \cdot TW_i} \times T_{io}.$$

10. The dynamic resources allocation system for guaranteeing tail latency SLO of latency-sensitive application according to claim 9, wherein the thread group comprises a backup thread and a main thread, and when the main thread is blocked by underlying I/O operations, the backup thread is awakened to process requests on the queue.

* * * * *